(12) United States Patent
Woerz et al.

(10) Patent No.: US 9,133,767 B2
(45) Date of Patent: Sep. 15, 2015

(54) FUEL INJECTING ASSEMBLY FOR GAS TURBINE ENGINE INCLUDING COOLING GAP BETWEEN SUPPLY STRUCTURES

(75) Inventors: Ulrich Woerz, Oviedo, FL (US); Jianfan Wu, Orlando, FL (US)

(73) Assignee: SIEMENS ENERGY, INC, Orlando, FL (US)

( * ) Notice: Subject to any disclaimer, the term of this patent is extended or adjusted under 35 U.S.C. 154(b) by 1073 days.

(21) Appl. No.: 13/195,915

(22) Filed: Aug. 2, 2011

(65) Prior Publication Data
US 2013/0031907 A1   Feb. 7, 2013

(51) Int. Cl.
| F02C 3/30 | (2006.01) |
| F23R 3/36 | (2006.01) |
| F02C 3/22 | (2006.01) |
| F02C 3/24 | (2006.01) |
| F23R 3/28 | (2006.01) |
| F23L 7/00 | (2006.01) |
| F23D 17/00 | (2006.01) |

(52) U.S. Cl.
CPC ............... *F02C 3/30* (2013.01); *F23D 17/002* (2013.01); *F23L 7/002* (2013.01); *F23R 3/28* (2013.01); *F05D 2270/082* (2013.01); *Y02E 20/16* (2013.01); *Y10T 29/49718* (2015.01)

(58) Field of Classification Search
CPC ............... F02C 3/30; F02C 3/22; F02C 3/24; F02C 3/36; F23R 3/28; F23D 17/002
USPC ............................... 60/742, 740, 39.463, 800
See application file for complete search history.

(56) References Cited

U.S. PATENT DOCUMENTS

| 3,763,650 | A | * | 10/1973 | Hussey et al. ............... 60/39.463 |
| 3,826,080 | A | * | 7/1974 | De Corso et al. ............ 60/39.55 |
| 5,222,357 | A | * | 6/1993 | Eddy et al. ........................ 60/800 |
| 5,235,814 | A | * | 8/1993 | Leonard ........................ 60/738 |
| 5,361,578 | A |   | 11/1994 | Donlan |
| 5,423,173 | A | * | 6/1995 | Lemon et al. .................... 60/776 |
| 7,104,069 | B2 | * | 9/2006 | Martling et al. ................. 60/775 |
| 7,536,862 | B2 | * | 5/2009 | Held et al. ........................ 60/742 |
| 2007/0003897 | A1 | * | 1/2007 | Koizumi et al. ............... 431/354 |
| 2008/0078180 | A1 | * | 4/2008 | Durbin et al. .................... 60/776 |

* cited by examiner

*Primary Examiner* — William H Rodriguez
*Assistant Examiner* — Carlos A Rivera

(57) ABSTRACT

A fuel injecting assembly for a combustor of a gas turbine engine has a gas supply structure, steam supply structure and oil fuel nozzle that are substantially separated to allow relative movement between a respective end section, end portion and end part due to thermal expansion and contraction.

20 Claims, 5 Drawing Sheets

FUEL INJECTING ASSEMBLY FOR GAS TURBINE ENGINE INCLUDING COOLING GAP BETWEEN SUPPLY STRUCTURES

FIELD OF THE INVENTION

The present invention relates to a fuel injecting assembly for a gas turbine engine. More specifically, the present invention relates to a fuel injecting assembly suitable for use with liquid or gaseous fuels and having the capability for steam injection for nitrous oxide (NOx) control.

BACKGROUND OF THE INVENTION

Gas turbine engines include one or more combustors adapted to produce a hot gas by burning a fuel in compressed air. A fuel injecting assembly or nozzle is employed to introduce the fuel into each combustor. To provide flexibility to the user, such fuel nozzles are often of the dual fuel type that are capable of burning either a liquid or a gaseous fuel, or both simultaneously.

Combustion in gas turbine combustors results in the formation of oxides of nitrogen (NOx) in the combusted gas, which is considered undesirable. One method of minimizing the formation of NOx involves injecting steam, via the fuel injecting nozzle, into the combustor along with the fuel.

U.S. Pat. No. 5,361,578 discloses a fuel nozzle assembly capable of burning either gaseous or liquid fuel, or both, along with steam injection. The fuel nozzle assembly includes an expansion bellows in an inner sleeve and an expansion bellows in a middle sleeve so as to reduce stresses in the inner and middle sleeves due to thermal expansion. While accommodating differential expansion between portions of the fuel nozzle assembly, bellows between the circumferential chambers have a limited life.

SUMMARY OF THE INVENTION

In accordance with a first aspect of the present invention, a fuel injecting assembly for a gas turbine engine is provided comprising a gas supply structure, a steam supply structure and an oil fuel nozzle. The gas supply structure may have a base section including at least one gas inlet, an intermediate section and an end section having at least one gas outlet. The gas supply structure defines a passage extending from the at least one gas inlet to the at least one gas outlet. The steam supply structure may have a base portion including at least one steam inlet, an intermediate portion and an end portion having at least one steam outlet. The steam supply structure defines a passageway extending from the at least one steam inlet to the at least one steam outlet. The oil fuel nozzle may have a base part including at least one oil inlet, an intermediate part and an end part having at least one oil outlet. The oil fuel nozzle defines a path extending from the at least one oil inlet to the at least one oil outlet. The gas supply structure, the steam supply structure and the oil fuel nozzle are joined only at the base section of the gas supply structure, the base portion of the steam supply structure and the base part of the oil fuel nozzle. Thus, the end section of the gas supply structure, the end portion of the steam supply structure and the end part of the oil fuel nozzle are free to move independently of one another in an axial direction as the steam supply structure, the gas supply structure and the oil fuel nozzle thermally expand and contract.

The gas supply structure may comprise a first inner surface defining a first inner bore for receiving the steam supply structure such that a first cooling gap is defined between the gas supply structure inner surface and the steam supply structure. The first cooling gap can receive cooling air.

A first cooling air inlet may be defined in at least one of the gas supply structure base section and the steam supply structure base portion. The first cooling air inlet communicates with the first cooling gap. A first cooling air outlet may be defined between the end section of the gas supply structure and the end portion of the steam supply structure. The first cooling air outlet communicates with the first cooling gap.

The end section of the gas supply structure may comprise a ring-shaped section having a plurality of circumferentially spaced apart gas outlets. The end portion of the steam supply structure may comprise a ring-shaped portion comprising a plurality of circumferentially spaced apart steam outlets.

The ring-shaped section is capable of being separated from the intermediate section of the gas supply structure and the ring-shaped portion is capable of being separated from the intermediate portion of the steam supply structure.

The steam supply structure may comprise a second inner surface defining a second inner bore. The oil fuel nozzle may have a generally cylindrical shape and may be positioned within the inner bore of the steam supply structure such that a second cooling gap is defined between the steam supply structure inner surface and the oil fuel nozzle. The second cooling gap is adapted to receive cooling air.

A second cooling air inlet may be defined in at least one of the steam supply structure base portion and the oil fuel nozzle base part. The second cooling air inlet communicates with the second cooling gap. A second cooling air outlet maybe defined between the steam supply structure end portion and the oil fuel nozzle end part. The second cooling air outlet communicates with the second cooling gap. Further, the end portion of the steam supply structure and the end part of the oil fuel nozzle may be configured such that the second cooling air outlet is shaped to cause cooling air exiting the second cooling air outlet to define an air shroud about oil exiting the end part of the oil fuel nozzle.

The gas supply structure may comprise a first double-walled annular structure and the steam supply structure may comprise a second double-walled annular structure.

In accordance with a second aspect of the present invention, a fuel injecting assembly is provided comprising a gas supply structure and a steam supply structure. The gas supply structure may have a base section including at least one gas inlet, an intermediate section and an end section having at least one gas outlet. The gas supply structure defines a passage extending from the at least one gas inlet to the at least one gas outlet. The steam supply structure may have a base portion including at least one steam inlet, an intermediate portion and an end portion having at least one steam outlet. The steam supply structure defines a passageway extending from the at least one steam inlet to the at least one steam outlet. The gas supply structure and the steam supply structure may be joined only at the gas supply structure base section and the steam supply structure base portion such that the gas supply structure end section and the steam supply structure end portion are free to move independently of one another in an axial direction as the steam supply structure and the gas supply structure thermally expand and contract.

The gas supply structure may comprise a first inner surface defining a first inner bore for receiving the steam supply structure such that a first cooling gap is defined between the gas supply structure inner surface and the steam supply structure. The first cooling gap is adapted to receive cooling air.

The first cooling air inlet may be defined in at least one of the gas supply structure base section and the steam supply structure base portion. The first cooling air inlet communicates with the first cooling gap. A first cooling air outlet may be defined between the gas supply structure end section and the steam supply structure end portion. The first cooling air outlet communicates with the first cooling gap.

The gas supply structure end section may comprise a ring-shaped section having a plurality of circumferentially spaced apart gas outlets and the steam supply structure end portion may comprise a ring-shaped portion comprising a plurality of circumferentially spaced apart steam outlets.

In accordance with a third aspect of the present invention, a process is provided for repairing a damaged one of an end section of a gas supply structure or an end portion of a steam supply structure in a fuel injecting assembly. The fuel injecting assembly may comprise the gas supply structure and the steam supply structure. The gas supply structure may have a base section including at least one gas inlet, an intermediate section and the end section having at least one gas outlet. The steam supply structure may have a base portion including at least one steam inlet, an intermediate portion and the end portion having at least one steam outlet. The gas supply structure and the steam supply structure may be joined only at the gas supply structure base section and the steam supply structure base portion. The process may comprise separating the damaged one end section or end portion from the corresponding intermediate section or intermediate portion, and coupling a new one end section or end portion to the corresponding intermediate section or intermediate portion.

The separating may comprise cutting the damaged one end section or end portion from the corresponding intermediate section or intermediate portion.

The coupling may comprise welding the new one end section or end portion to the corresponding intermediate section or intermediate portion.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
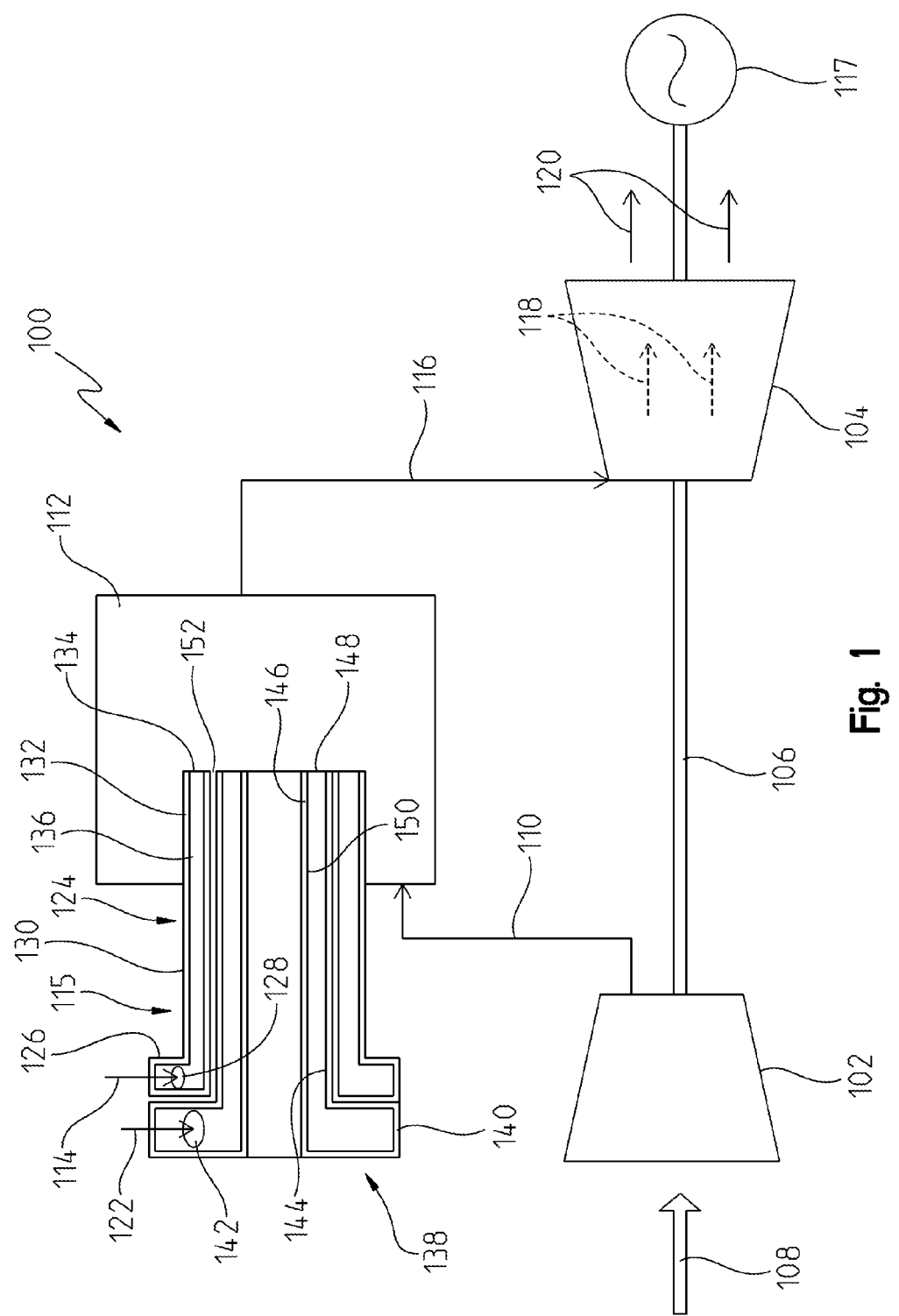
FIG. 1 depicts a diagrammatic schematic of a gas turbine engine incorporating a fuel injecting assembly according to the present invention.

Referring to the drawings, there is shown in FIG. 1 a schematic diagram of a gas turbine engine 100 according to one embodiment of the present invention. The gas turbine engine 100 is comprised of a compressor 102 that is driven by a gas turbine 104 via a shaft 106. Ambient air 108 is drawn into the compressor 102 and compressed. Compressed air 110 produced by the compressor 102 is directed to one or more combustors 112 in which a fuel 114 and compressed air are mixed and burned. The fuel 114 may be a liquid, such as no. 2 distillate oil, or a gas, such as natural gas, and is introduced into each combustor 112 by a corresponding fuel injecting assembly 115. Hot compressed gas 116 produced by each combustor 112 is directed to the gas turbine 104 where it is expanded, thereby producing shaft horsepower for driving the compressor 102, as well as a load, such as an electric generator 117. Expanded gas 118 produced by the turbine 104 is exhausted as exhaust gas 120, either to the atmosphere directly or, in a combined cycle plant, to a heat recovery steam generator and then to atmosphere.

The fuel injecting assembly 115 injects the fuel 114 into the combustor 112 as well as steam 122 at a higher temperature for mitigating undesirable exhaust emissions in the exhaust gas 120. The fuel injecting assembly 115 incorporates features for increasing service life by mitigating thermal stresses between cooler structures that deliver the fuel 114 and the hotter structures that deliver the steam 122.

To that end, a gas supply structure 124 of the fuel injecting assembly 115 has a base section 126 including at least one gas inlet 128, an intermediate section 130 and an end section 132 having at least one gas outlet 134. The gas supply structure 124 has a passage 136 defined as extending from the at least one gas inlet 128 to the at least one gas outlet 134.

A steam supply structure 138 of the fuel injecting assembly 115 has a base portion 140 including at least one steam inlet 142, an intermediate portion 144 and an end portion 146 having at least one steam outlet 148. The steam supply structure 138 has a passageway 150 defined as extending from the at least one steam inlet 142 to the at least one steam outlet 148.

In the illustrated embodiment, the gas supply structure 124 and the steam supply structure 138 are joined only at the base section 126 of the gas supply structure 124 and the base portion 140 of the steam supply structure 138 such that the end section 132 of the gas supply structure 124 and the end portion 146 of the steam supply structure 138 are free to move independently of one another in an axial direction as the steam supply structure 138 and the gas supply structure 124 thermally expand and contract during operation of the gas turbine engine 100.

In one aspect, the gas supply structure 124 of the fuel injecting assembly 115 comprises a first inner surface defining a first inner bore for receiving the steam supply structure such that a first cooling gap 152 is defined between the inner surface of the gas supply structure 124 and the steam supply structure 138. The first cooling gap can receive cooling air to further mitigate thermal stresses.

Figure 2:
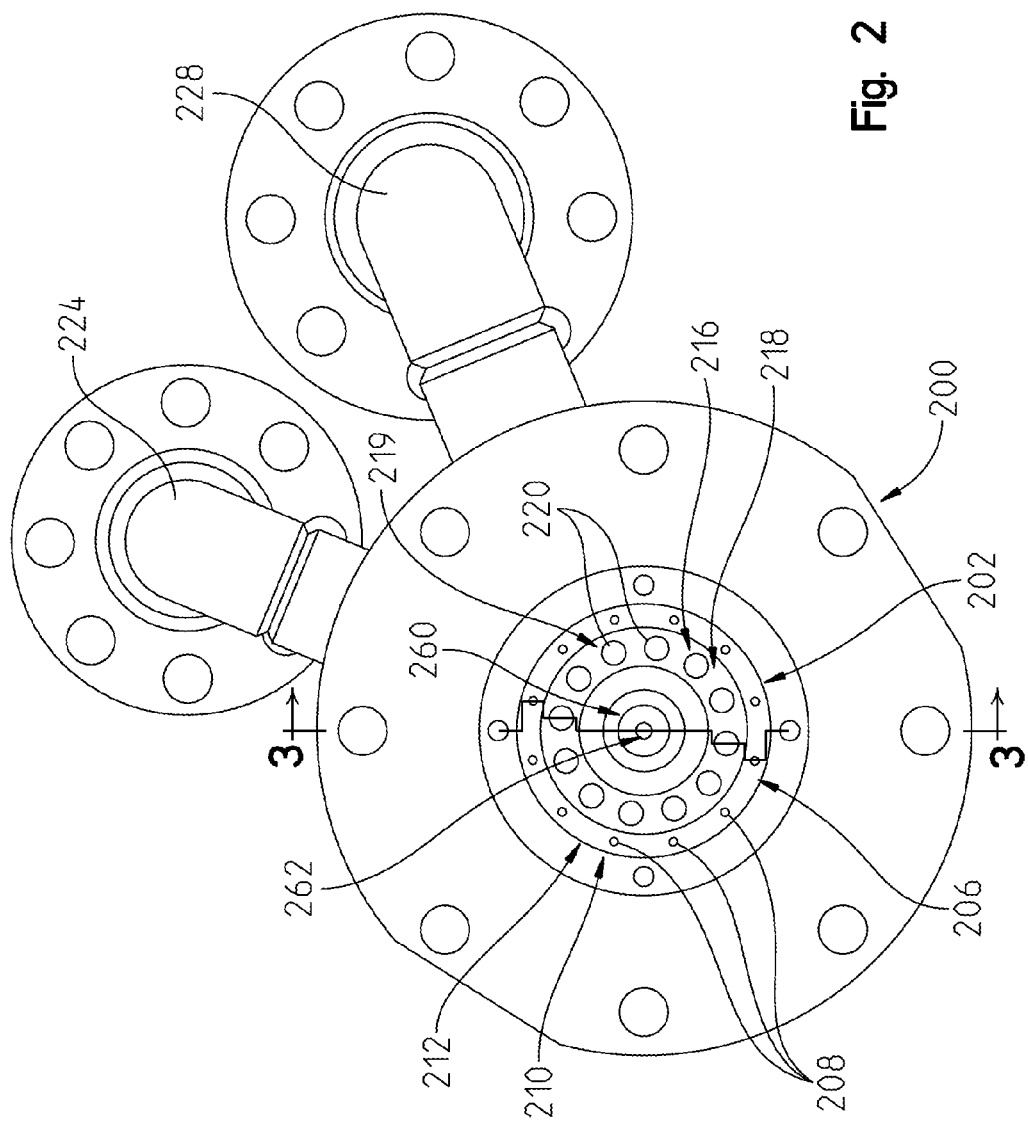
FIG. 2 depicts a front view of an exemplary fuel injecting assembly according to a further embodiment of the present invention.

In FIGS. 2-5, a fuel injecting assembly 200 constructed in accordance with a further embodiment of the present invention is illustrated. With particular reference to FIG. 2 from a front view, a fuel nozzle face 202 is presented to an interior of a corresponding combustor (not shown in FIG. 2) for injecting fuel and steam. For clarity, a swirl plate to aid in mixing the fuel and compressed air and cooling of the fuel nozzle face 202 and combustor 112 is omitted. In an exemplary aspect, the fuel can be dispensed from a ring-shaped section 206 having a plurality of circumferentially spaced apart gas outlets 208 of an end section 210 of a gas supply structure 212. Alternatively, oil can be dispensed from an oil outlet 262 of an oil fuel nozzle 260. An end portion 216 of a steam supply structure 218 comprises a ring-shaped portion 219 comprising a plurality of circumferentially spaced apart steam outlets 220.

Figure 3:
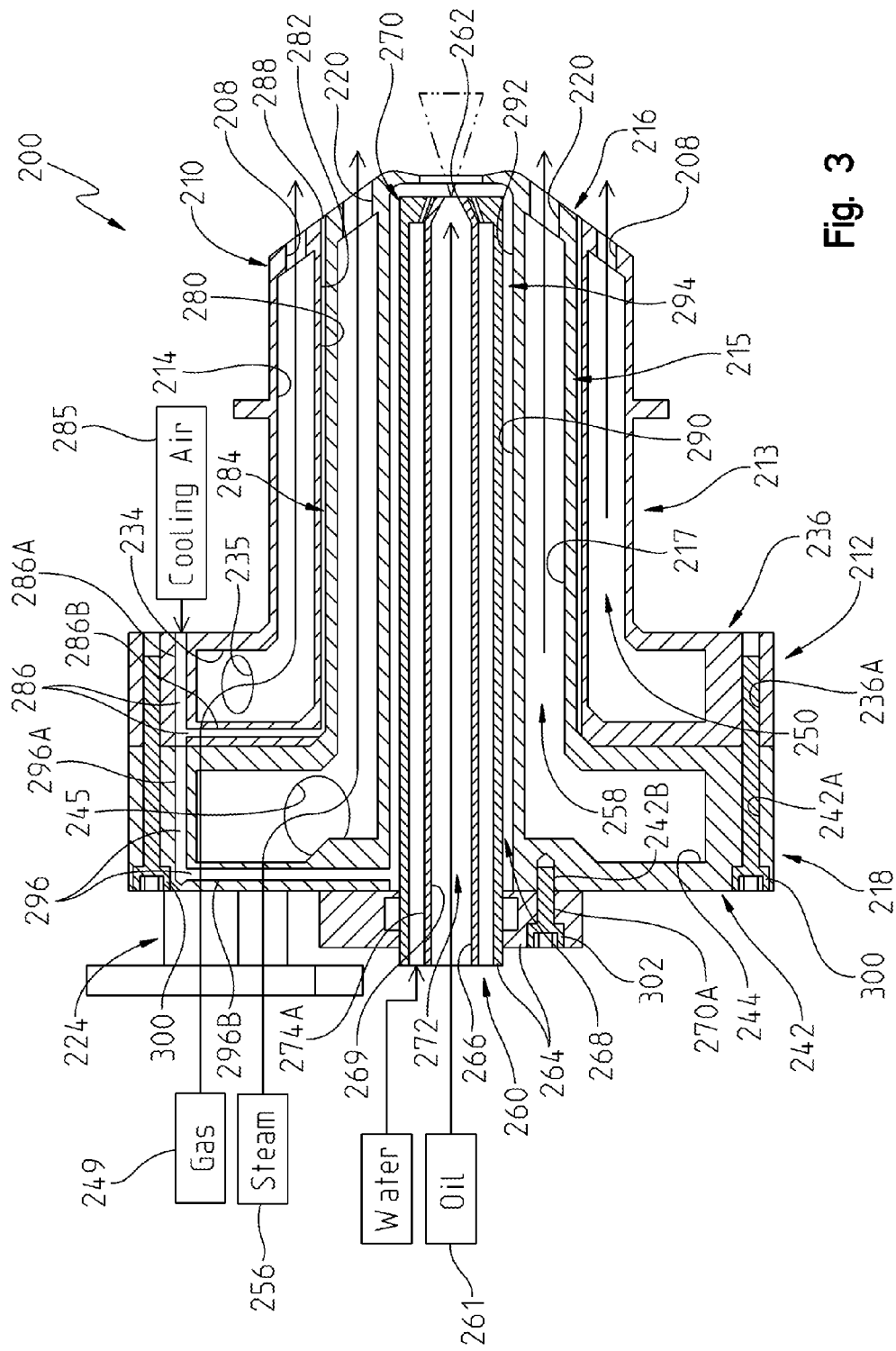
FIG. 3 depicts a side cross sectional view along section line 3-3 in FIG. 2.

With particular reference to FIGS. 2 and 3, a gas inlet conduit 224 is coupled to a base section 236 of the gas supply structure 212 so as to supply the base section 236 with a gas fuel. A first generally annular manifold 234 and an inlet 235 are formed in the base section 236 of the gas supply structure 212. The inlet 235 communicates with the gas inlet conduit 224 and the manifold 234. Gas fuel 249 supplied by the gas inlet conduit 224 passes through the inlet 235 of the gas supply structure 212 then into the manifold 234. The gas supply structure 212 further comprises an intermediate section 213 defining a first annular pathway 214 and the end section 210 having the plurality of circumferentially spaced apart gas outlets 208. A passage 250 extends from the inlet 235 to the outlets 208 and is defined by the manifold 234 and the annular pathway 214.

A steam inlet conduit 228 is coupled to a base portion 242 of the steam supply structure 218 so as to supply the base portion 242 with steam. A second generally annular manifold 244 and an inlet 245 are formed in the base portion 242 of the steam supply structure 218. The inlet 245 communicates with the steam inlet conduit 228 and the manifold 244. Steam supplied by the steam inlet conduit 228 passes through the inlet 245 of the steam supply structure 218 then into the manifold 244. The steam supply structure 218 further comprises an intermediate portion 215 defining a second annular pathway 217 and the end portion 216 having the plurality of circumferentially spaced apart steam outlets 220. A passageway 258 extends from the inlet 245 to the outlets 220 and is defined by the manifold 244 and the annular pathway 217.

The oil fuel nozzle 260 has a base part 264 including at least one oil inlet 266, an intermediate part 268 and an end part 270 having the oil outlet 262. A central bore 269 extends from the inlet 266 to the outlet 262. The oil fuel nozzle bore 269 defines a path 272 extending from the oil inlet 266 to the oil outlet 262. The path 272 may receive fuel oil 261, naphtha or any other liquid fuel. The nozzle 260 further comprises an annular chamber 274 located radially outwardly from the central bore 269 for receiving water 263 to be dispensed via outlets 274B near the oil outlet 262, see FIG. 4. The water 263 may have a temperature of from about 10 degrees C. to about 40 degrees C. The water 263 is received at an inlet 274A to the annular chamber 274. The water 263 is dispensed from the annular chamber 274 through the outlets 274B and functions to mitigate NOx emissions.

The gas supply structure 212 comprise a first inner surface 280 defining a first inner bore 282 for receiving the steam supply structure 218 such that a first cooling gap 284 is defined between the gas supply structure inner surface 280 and the steam supply structure 218. A first cooling air inlet 286 defined by one or more first cooling air supply bores 286A and one or more second cooling air supply bores 286B is provided in the gas supply structure base section 236. The first cooling air inlet 286 communicates with the first cooling gap 284 for supplying cooling air to the first cooling gap 284. Structure not shown provides the cooling air 285 from the compressor to the first cooling air inlet 286. A first cooling air outlet 288 is substantially annular in shape and is defined between the end section 210 of the gas supply structure 212 and the end portion 216 of the steam supply structure 218, see FIGS. 3 and 4. The first cooling air outlet 288 communicates with the first cooling gap 284.

Figure 4:
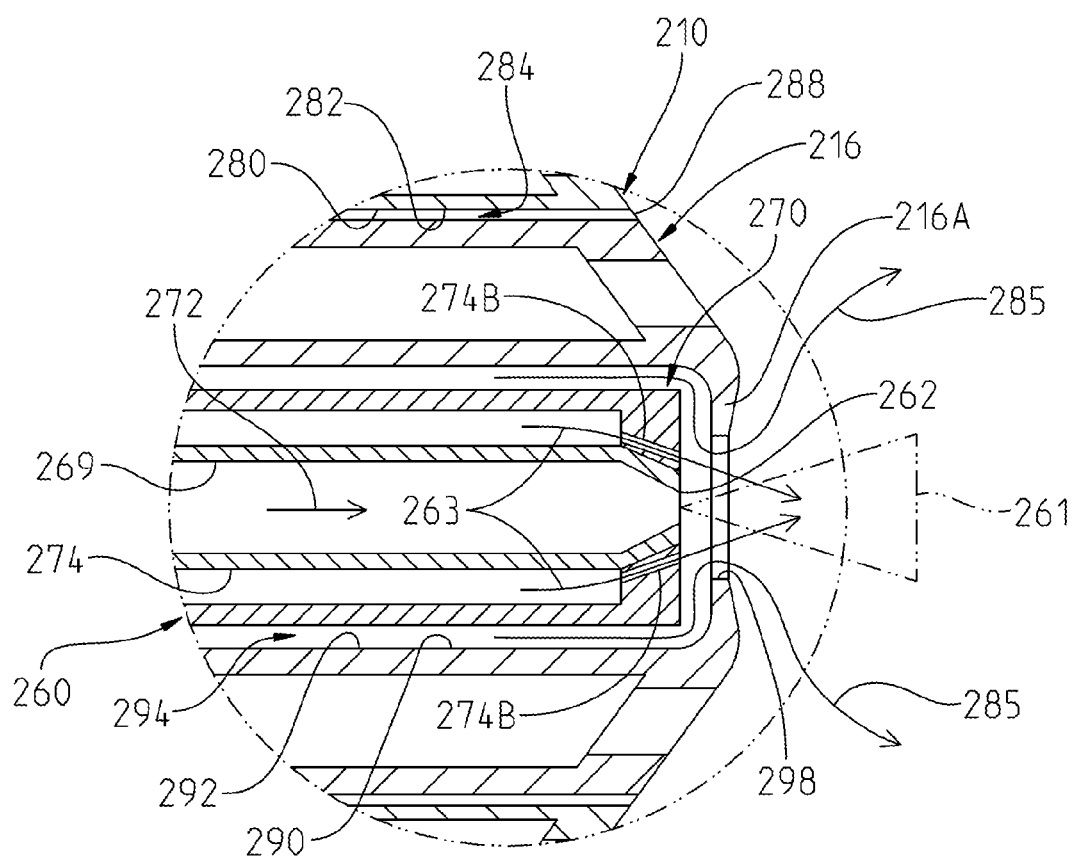
FIG. 4 depicts an enlarged view of an end section of a gas supply structure and an end portion of a steam supply structure.

The steam supply structure 218 may comprise a second inner surface 290 defining a second inner bore 292, see FIGS. 3 and 4. The oil fuel nozzle intermediate part 268, which has a generally cylindrical shape in the illustrated embodiment, is positioned within the inner bore 292 of the steam supply structure 218 such that a second cooling gap 294 is defined between the steam supply structure inner surface 290 and the oil fuel nozzle 260.

A second cooling air inlet 296 defined by one or more first cooling air supply bores 296A and one or more second cooling air supply bores 296B is provided in the steam supply structure base portion 242. The second cooling air inlet 296 communicates with the second cooling gap 294 and the first cooling air inlet 286. A second cooling air outlet 298 is defined between the steam supply structure end portion 216 and the oil fuel nozzle end part 270. The second cooling air outlet 298 communicates with the second cooling gap 294. As is apparent from FIG. 4, the steam supply structure end portion 216 has a radially extending part 216A extending inward towards the oil fuel nozzle outlet 262 so as to cause cooling air 285 exiting the second cooling air outlet 298 to define an air shroud about oil 261 exiting the outlet 262. The air shroud causes a resulting flame from oil burning to be pushed downstream from the oil fuel nozzle outlet 262 thereby keeping the outlet 262 cooler and reducing coking at the outlets 208, 220 and 262.

The first and second cooling gaps 284 and 294, whether provided with or without cooling air, can increase the lifetime of the fuel injecting assembly 200 since the gaps 284 and 294 serve as insulating layers that lower the overall rate at which energy in the form of heat transfers from the relatively hot steam supply structure 218 to the relatively cold gas supply structure 212 and the oil fuel nozzle 260.

In the illustrated embodiment, the gas supply structure 212, the steam supply structure 218 and the oil fuel nozzle 260 are joined only at the base section 236 of the gas supply structure 212, the base portion 242 of the steam supply structure 218 and the base part 264 of the oil fuel nozzle 260. More specifically, each of a plurality of circumferentially spaced apart bolts 300 passes through a corresponding bore 236A in the base section 236 of the gas supply structure 212 and a corresponding bore 242A of the base portion 242 of the steam supply structure 218 so as to couple the base section 236 to the base portion 242. Further, each of one more bolts 302 extends through a corresponding bore 270A in the base part 264 of the oil fuel nozzle 260 and a corresponding bore 242B of the base portion 242 of the steam supply structure 218 so as to couple the oil fuel nozzle 260 to the steam supply structure 218. Hence, the intermediate section 213, the intermediate portion 215 and the intermediate part 268 as well as the end section 210, the end portion 216 and the end part 270 are not directly coupled to one another. Thus, the end section 210 of the gas supply structure 212, the end portion 216 of the steam supply structure 218 and the end part 270 of the oil fuel nozzle 260 are free to move or expand independently of one another in an axial direction as the steam supply structure 218, the gas supply structure 212 and the oil fuel nozzle 260 thermally expand and contract.

As noted above, gas fuel 249 supplied by the gas inlet conduit 224 passes through the inlet 235 of the gas supply structure 212 then into the manifold 234. From the manifold 234, the gas fuel travels through the first annular pathway 214 and exits the passage 250 through the circumferentially spaced apart gas outlets 208 into a corresponding combustor. Thereafter, the gas fuel 249 is mixed with compressed air and burned in the combustor to produce hot working gases.

Superheated steam 256 is injected into the combustor while at a temperature of from about 200 degrees C. to about 350 degrees C. via the fuel injecting assembly 200 in order to minimize the formation of NOx. As noted above, steam 256 supplied by the steam inlet conduit 228 passes through the inlet 245 of the steam supply structure 218 then into the manifold 244. From the manifold 244, the steam moves through the second annular pathway 217 and exits the passageway 258 via the steam outlets 220. Thereafter, the steam mixes with the gas fuel and the compressed air so as to reduce NOx formation during combustion of the fuel gas/compressed air mixture.

As noted above, the oil fuel nozzle 260 supplies fuel oil or the like via its outlet 262. Thus, the fuel injecting assembly 200 is capable of injecting gas fuel via the gas supply structure 212 or liquid fuel oil via the oil fuel nozzle 260 for burning, or both simultaneously, as well as injecting steam into the combustor via the steam supply structure 218 so as to reduce NOx emissions. As also noted above, the oil fuel nozzle 260 is capable of injecting water near its oil outlet 262 so as to further mitigate NOx emissions.

Figure 5:
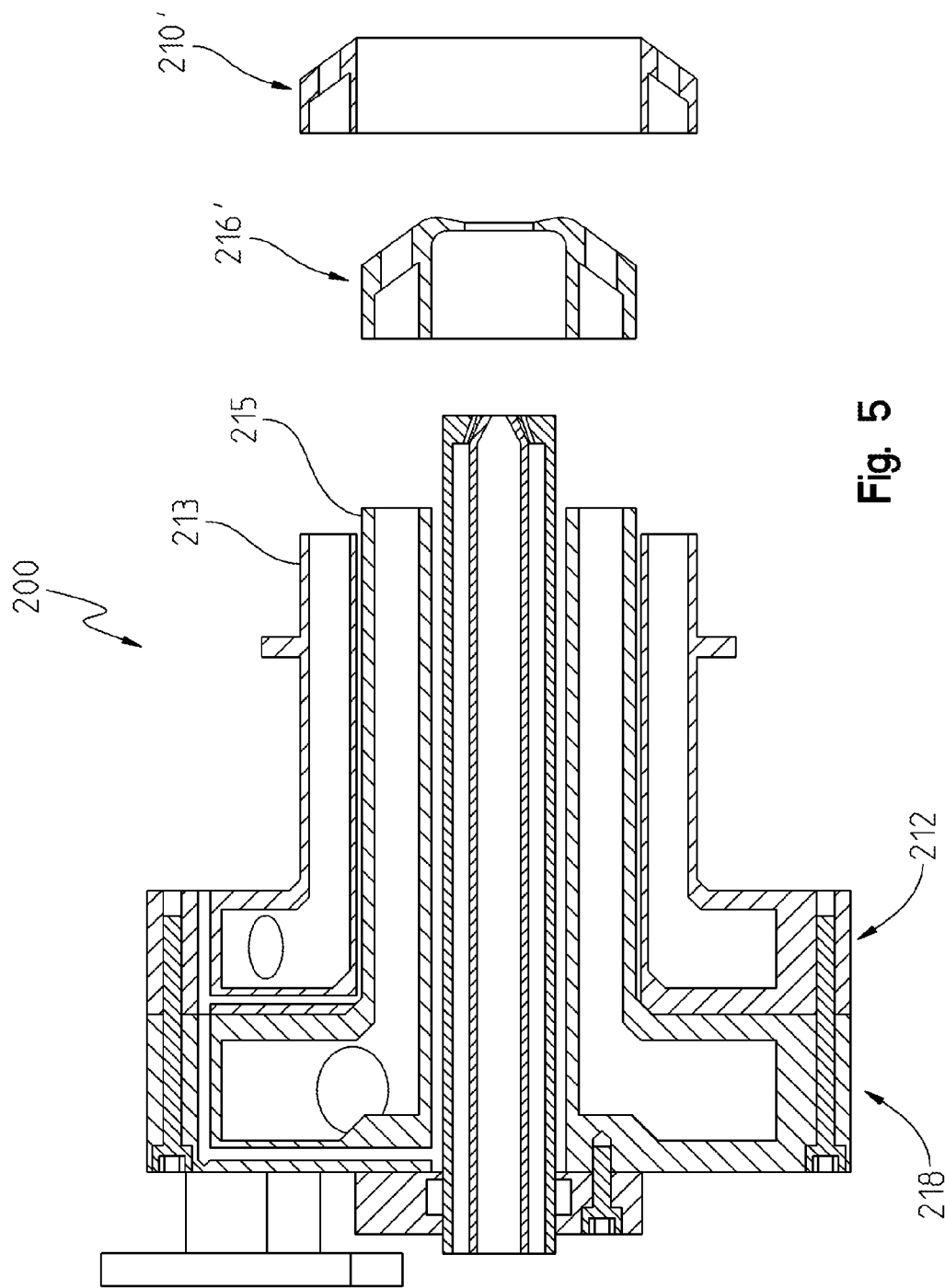
FIG. 5 depicts a side cross section view along section line 3-3 in FIG. 2 with a damaged end section of a gas supply structure and a damaged end portion of a steam supply structure both removed and new end section and new end portion shown in exploded view.

In FIG. 5, in an exemplary aspect the fuel injecting assembly 200 can be repaired by removing a damaged end section 210 and/or a damaged end portion 216 and attaching a new end section 210' and/or a new end portion 216'. Thus, if the end section 210 or the end portion 216 shows cracks, the damaged part can easily be replaced separately from the other parts.

To that end, the present disclosure provides a process for repairing a damaged one of the end section 210 of the gas supply structure 212 or the end portion 216 of the steam supply structure 218. The process comprises separating, such as by cutting, the damaged one end section 210 or end portion 216 from the corresponding intermediate section or intermediate portion. The process further comprises coupling, such as by welding, a new one end section 210 or end portion 216 to the corresponding gas supply structure intermediate section 213 or steam supply structure intermediate portion 215.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fuel injecting assembly comprising:
    a gas supply structure for injecting gas fuel, said gas supply structure having a base section including a gas annular manifold and at least one gas inlet, an intermediate section and an end section having at least one gas outlet, said gas supply structure defining a passage extending from said at least one gas inlet to said at least one gas outlet;
    a steam supply structure for injecting steam, said steam supply structure having a base portion including a steam annular manifold and at least one steam inlet, an intermediate portion and an end portion having at least one steam outlet, said steam supply structure defining a passageway extending from said at least one steam inlet to said at least one steam outlet;
    an oil fuel nozzle having a base part including at least one oil inlet, an intermediate part and an end part having at least one oil outlet, said oil fuel nozzle defining a path extending from said at least one oil inlet to said at least one oil outlet,
    wherein said gas supply structure, said steam supply structure and said oil fuel nozzle are joined only at said gas supply structure base section, said steam supply structure base portion and said oil fuel nozzle base part such that said gas supply structure end section, said steam supply structure end portion and said oil fuel nozzle end part are free to move independently of one another in an axial direction as said gas supply structure, said steam supply structure and said oil fuel nozzle thermally expand and contract; and
    a first cooling gap adapted to receive cooling air from a first cooling air inlet, wherein a portion of said first cooling air inlet is at least partially located between a pathway of said gas annular manifold and a pathway of said steam annular manifold.

2. The fuel injecting assembly of claim 1, wherein said gas supply structure comprises a first inner surface defining a first inner bore for receiving said steam supply structure such that said first cooling gap is defined between said gas supply structure inner surface and said steam supply structure.

3. The fuel injecting assembly of claim 2, wherein said first cooling air inlet is defined in at least one of said gas supply structure base section and said steam supply structure base portion, said first cooling air inlet communicating with said first cooling gap, and a first cooling air outlet is defined between said gas supply structure end section and said steam supply structure end portion, said first cooling air outlet communicating with said first cooling gap.

4. The fuel injecting assembly of claim 3, wherein gas supply structure end section comprises a ring-shaped section having a plurality of circumferentially spaced apart gas outlets and said steam supply structure end portion comprises a ring-shaped portion comprising a plurality of circumferentially spaced apart steam outlets.

5. The fuel injecting assembly of claim 4, wherein said ring-shaped section is capable of being separated from said gas supply structure intermediate section and said ring-shaped portion is capable of being separated from said steam supply structure intermediate portion.

6. The fuel injecting assembly of claim 3, wherein said steam supply structure comprises a second inner surface defining a second inner bore and said oil fuel nozzle has a generally cylindrical shape, said oil fuel nozzle is positioned within said inner bore of said steam supply structure such that a second cooling gap is defined between said steam supply structure inner surface and said oil fuel nozzle, said second cooling gap is adapted to receive cooling air.

7. The fuel injecting assembly of claim 6, wherein a second cooling air inlet is defined in at least one of said steam supply structure base portion and said oil fuel nozzle base part, said second cooling air inlet communicating with said second cooling gap, and a second cooling air outlet is defined between said steam supply structure end portion and said oil fuel nozzle end part, said second cooling air outlet communicating with said second cooling gap.

8. The fuel injecting assembly of claim 7, wherein said steam supply structure end portion and said oil fuel nozzle end part are configured such that said second cooling air outlet is shaped to cause cooling air exiting said second cooling air outlet to define an air shroud about oil exiting said oil fuel nozzle end part.

9. The fuel injecting assembly of claim 1, wherein said gas supply structure comprises a first double-walled annular structure and said steam supply structure comprises a second double-walled annular structure.

10. The fuel injecting assembly of claim 2, wherein said first cooling air inlet is defined by at least one first cooling air supply bore and at least one second cooling air supply bore, said portion of said first cooling air inlet partially located between said pathway of said gas annular manifold and said pathway of said steam annular manifold is defined by said second cooling air supply bore extending radially inwardly from said first cooling air supply bore to said first inner bore.

11. The fuel injecting assembly of claim 3, wherein said first cooling gap extends axially from said second cooling air supply bore to the first cooling air outlet.

12. The fuel injecting assembly of claim 7, wherein said first cooling gap is located radially inwardly of said intermediate and end sections of said gas supply structure, said intermediate and end portions of said steam supply structure are located radially inwardly of said first cooling gap, and said second cooling gap is located radially inwardly of said steam supply structure.

13. A fuel injecting assembly comprising:
- a gas supply structure for injecting gas fuel, said gas supply structure having a base section including a gas annular manifold and at least one gas inlet, an intermediate section and an end section having at least one gas outlet, said gas supply structure defining a passage extending from said at least one gas inlet to said at least one gas outlet;
- a steam supply structure for injecting steam, said steam supply structure having a base portion including a steam annular manifold and at least one steam inlet, an intermediate portion and an end portion having at least one steam outlet, said steam supply structure defining a passageway extending from said at least one steam inlet to said at least one steam outlet;
- wherein said gas supply structure and said steam supply structure are joined only at said gas supply structure base section and said steam supply structure base portion such that said gas supply structure end section and said steam supply structure end portion are free to move independently of one another in an axial direction as said steam supply structure and said gas supply structure thermally expand and contract; and
- a first cooling gap adapted to receive cooling air from a first cooling air inlet, wherein a portion of said first cooling air inlet is at least partially located between a pathway of said gas annular manifold and a pathway of said steam annular manifold.

14. The fuel injecting assembly of claim 13, wherein said gas supply structure comprises a first inner surface defining a first inner bore for receiving said steam supply structure such that said first cooling gap is defined between said gas supply structure inner surface and said steam supply structure.

15. The fuel injecting assembly of claim 14, wherein said first cooling air inlet is defined in at least one of said gas supply structure base section and said steam supply structure base portion, said first cooling air inlet communicating with said first cooling gap, and a first cooling air outlet is defined between said gas supply structure end section and said steam supply structure end portion, said first cooling air outlet communicating with said first cooling gap.

16. The fuel injecting assembly of claim 15, wherein said gas supply structure end section comprises a ring-shaped section having a plurality of circumferentially spaced apart gas outlets and said steam supply structure end portion comprises a ring-shaped portion comprising a plurality of circumferentially spaced apart steam outlets.

17. The fuel injecting assembly of claim 14, wherein said first cooling air inlet is defined by at least one first cooling air supply bore and at least one second cooling air supply bore, said portion of said first cooling air inlet partially located between said pathway of said gas annular manifold and said pathway of said steam annular manifold is defined by said second cooling air supply bore extending radially inwardly from said first cooling air supply bore to said first inner bore.

18. A process for repairing a damaged one of an end section of a gas supply structure or an end portion of a steam supply structure in a fuel injecting assembly, wherein the fuel injecting assembly comprises:
- the gas supply structure provided for injecting gas fuel and having a base section including a gas annular manifold and at least one gas inlet, an intermediate section and the end section having at least one gas outlet, said gas supply structure defining a passage extending from said at least one gas inlet to said at least one gas outlet;
- the steam supply structure provided for injecting steam and having a base portion including a steam annular manifold and at least one steam inlet, an intermediate portion and the end portion having at least one steam outlet, said steam supply structure defining a passageway extending from said at least one steam inlet to said at least one steam outlet, and wherein said gas supply structure and said steam supply structure are joined only at the gas supply structure base section and the steam supply structure base portion such that said gas supply structure end section and said steam supply structure end portion are free to move independently of one another in an axial direction as said steam supply structure and said gas supply structure thermally expand and contract,
- a first cooling gap adapted to receive cooling air from a first cooling air inlet, wherein said first cooling air inlet is at least partially located between a pathway of said gas annular manifold and a pathway of said steam annular manifold, said process comprising:
- separating the damaged one end section or end portion from the corresponding intermediate section or intermediate portion; and
- coupling a new one end section or end portion to the corresponding intermediate section or intermediate portion.

19. The process as set out in claim 18, wherein said separating comprising cutting the damaged one end section or end portion from the corresponding intermediate section or intermediate portion.

20. The process as set out in claim 18, wherein said coupling comprising welding the new one end section or end portion to the corresponding intermediate section or intermediate portion.

* * * * *